United States Patent
Harris et al.

(10) Patent No.: US 10,559,297 B2
(45) Date of Patent: Feb. 11, 2020

(54) AUDIO LANDMARKING FOR AURAL USER INTERFACE

(71) Applicant: Microsoft Technology Licensing, LLC, Redmond, WA (US)

(72) Inventors: Jonathan Harris, Redmond, WA (US); David Lu, Seattle, WA (US); Hauke Gentzkow, Seattle, WA (US); Allen L. Ussher, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 15/361,741

(22) Filed: Nov. 28, 2016

(65) Prior Publication Data
US 2018/0151173 A1     May 31, 2018

(51) Int. Cl.
| | |
|---|---|
| *G10L 13/027* | (2013.01) |
| *G10L 13/10* | (2013.01) |
| *G06F 3/16* | (2006.01) |
| *G10L 25/87* | (2013.01) |

(52) U.S. Cl.
CPC .............. *G10L 13/10* (2013.01); *G06F 3/167* (2013.01); *G10L 25/87* (2013.01); *G10L 13/027* (2013.01)

(58) Field of Classification Search
CPC .................................................... G10L 13/027
See application file for complete search history.

(56) References Cited

U.S. PATENT DOCUMENTS

| | | | |
|---|---|---|---|
| 5,287,102 A | 2/1994 | McKiel | |
| 6,046,722 A | 4/2000 | McKiel | |
| 6,111,562 A | 8/2000 | Downs et al. | |
| 6,297,818 B1 | 10/2001 | Ulrich et al. | |
| 7,772,965 B2 | 8/2010 | Farhan et al. | |
| 7,844,462 B2 | 11/2010 | Mayer-Ullmann | |
| 7,966,184 B2 | 6/2011 | O'Conor et al. | |
| 8,230,034 B2 * | 7/2012 | Atkins | G06Q 10/107 709/206 |
| 8,381,107 B2 | 2/2013 | Rottler et al. | |
| 8,805,561 B2 | 8/2014 | Wilcock et al. | |

(Continued)

OTHER PUBLICATIONS

"International Search Report and Written Opinion Issued in PCT Application No. PCT/US2017/062657", dated Feb. 21, 2018, 10 Pages.

(Continued)

*Primary Examiner* — Feng-Tzer Tzeng
(74) *Attorney, Agent, or Firm* — Michael Best & Friedrich LLP

(57) ABSTRACT

A computing device and method for controlling narration. The computing device comprises a display device displaying a visual user interface including textual information, and an electronic processor. The electronic processor executing instructions to identify a plurality of discrete textual data elements included in the textual information, map each of the plurality of discrete textual data elements to an audio data element, generate an implicit audio narration including the audio data element mapped to each of the plurality of discrete textual data elements and at least one of an audible tone and a pause between audio data elements mapped to at least two of the plurality of discrete textual data elements, and output the implicit audio narration.

20 Claims, 11 Drawing Sheets

(56) References Cited

U.S. PATENT DOCUMENTS

| | | | |
|---|---|---|---|
| 9,223,547 B1 | 12/2015 | Endresen et al. | |
| 2002/0002462 A1* | 1/2002 | Tetsumoto | H04M 3/4938 704/270.1 |
| 2002/0184030 A1* | 12/2002 | Brittan | G10L 13/08 704/260 |
| 2004/0218451 A1 | 11/2004 | Said et al. | |
| 2006/0100877 A1 | 5/2006 | Zhang et al. | |
| 2009/0254345 A1* | 10/2009 | Fleizach | G10L 13/043 704/260 |
| 2012/0310642 A1 | 12/2012 | Cao et al. | |
| 2014/0237369 A1 | 8/2014 | Canitz | |
| 2015/0079563 A1 | 3/2015 | Yeh et al. | |

OTHER PUBLICATIONS

Murphy, et al., "Audio for a Multimodal Assistive Interface", In Proceedings of Eleventh Meeting of the International Conference on Auditory Display, Limerick, Jul. 6, 2005, pp. 1-4.

* cited by examiner

AUDIO LANDMARKING FOR AURAL USER INTERFACE

FIELD

Embodiments relate to systems and methods for controlling implicit narration of textual information presented by a user interface on a display.

BACKGROUND

A user typically interacts with a computer running a software program or application via a visual user interface (for example, a graphical user interface (GUI)). The user may use a touchpad, keyboard, mouse, or other input device to enter commands, selections, and other input. The application then responds to or processes this input. The graphical user interface may present links, controls, data, or other interactive options for the user in a visual form such as texts or images. While graphical user interfaces are useful, there are times when an aural or audio interface is useful. For example, an audio interface is useful when a user has impaired vision or when it is impossible or impractical to view the graphical user interface, such as when a user is operating an automobile and maintaining his her gaze on the road ahead.

SUMMARY

Narration-based applications have been developed as a mechanism of providing an audio interface for applications designed for user interaction via a graphical user interface. Current, narration-based applications generally deliver information contained in the graphical user interface by reading (for example, via text-to-speech conversion) what is shown on the screen in a literal or verbatim manner. They are designed to read exactly what is on the screen in an effort to ensure fidelity in the transformation from a visual experience to an audible experience. However, literally reading of elements in the graphical user interfaces often produces an audio output that is difficult to comprehend. Additionally, user interfaces built primarily for a visual framework do not translate well to an audible experience. Finally, currently-available narration-based user interfaces usually fail to consider human cognitive processes that take place while visually gathering information from a display device and translate those cognitive processes into processes that occur when gathering information aurally. Information laid out on a display device is typically scanned and rescanned by the human eye and brain using context and association. This facilitates navigation of the information. Translating textual and/or graphical information to an audio format (with precision) results in overloading the listener with details since the streamed format prevents the user from efficiently scanning/re-scanning material. As a result, task completion times are often increased by a factor of three to ten times the original visual task completion time as listeners struggle to comprehend what they are listening to.

Thus, using embodiments of implicit narration provided herein, the textual information on the screen of a computer or similar user device is re-interpreted by accounting for limits of human cognition. By the addition of audible landmarks that represent visual indications (such as visual breaks, colors, etc.) in a stream of narration the audible experience mirroring the visual experience is achieved. For example, instead of providing a direct translation of textual and graphical information to an audio format (with precision) an implicit narration is provided. Methods and systems described herein provide for an implicit narration including audible tones interlaced within the narration to highlight key aspects within the textual information in order to reduce cognitive overload and enhance listening comprehension. Audio cues are generated that may give listeners an indication of where they are in a hierarchy of information are associated with the user interface control in which the material is contained. For example, the listener may be able to discern that information contained in a label or a button, but not where the information is in terms of an overall taxonomy. By introducing "bumpers" (for example, specific sounds related to an abstract concept of navigating the taxonomy instead of the literal control space) the user can orient by sound to the interface easily.

An embodiment provides a computing device for controlling narration. The computing device comprises a display device displaying a visual user interface including textual information and an electronic processor. The electronic processor is configured to execute instructions to identify a plurality of discrete textual data elements included in the textual information, map each of the plurality of discrete textual data elements to an audio data element, generate an implicit audio narration including the audio data element mapped to each of the plurality of discrete textual data elements and at least one of an audible tone and a pause between audio data elements mapped to at least two of the plurality of discrete textual data elements, and output the implicit audio narration.

Another embodiment provides a method for controlling narration. The method includes receiving textual information from a visual user interface. The method also includes identifying, with an electronic processor, a plurality of discrete textual data elements included in the textual information. The method also includes mapping, with the electronic processor, each of the plurality of discrete textual data elements to an audio data element. The method further includes generating, with a narration controller, an implicit audio narration including the audio data element mapped to each of the plurality of discrete textual data elements and at least one of an audible tone and a pause between audio data elements mapped to at least two of the plurality of discrete textual data elements and outputting the implicit audio narration.

Another embodiment provides a tangible machine-readable medium containing computer-executable instructions that when executed by one or more processors cause the one or more processors to perform a method for controlling narration. The method includes receiving textual information from a visual user interface; identifying, with an electronic processor, a plurality of discrete textual data elements included in the textual information; mapping, with the electronic processor, each of the plurality of discrete textual data elements to an audio data element; generating, with a narration controller, an implicit audio narration including the audio data element mapped to each of the plurality of discrete textual data elements and at least one of an audible tone and a pause between audio data elements mapped to at least two of the plurality of discrete textual data elements; and outputting the implicit audio narration.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
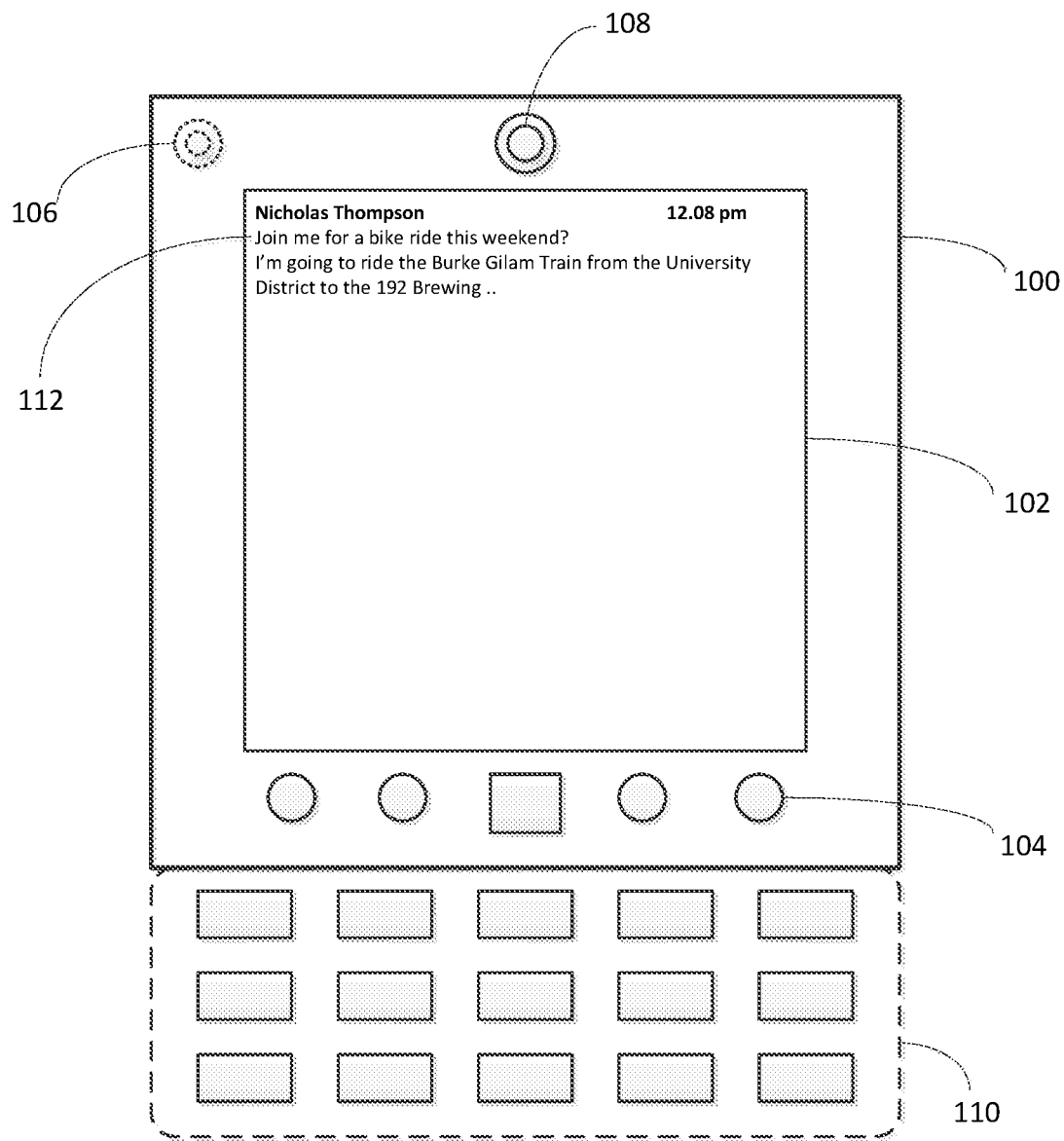
FIG. 1 illustrates a computing device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

Before any embodiments are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Some embodiments may be a machine-implemented method, a tangible machine-readable medium having a set of instructions detailing a method stored thereon for at least one processor, or a user interface narrator for a computing device.

FIG. 1 illustrates a computing device 100 in accordance with some embodiments. The computing device 100 includes a display device 102, input 104, speaker 106, an optional camera 108, an optional keyboard 110 and a visual user interface 112 displaying textual information. To improve interactions with sight-impaired users or when it is impossible or impractical to view the graphical user interface, the computing device 100 may use a narration controller (described below) to vocalize items in the visual user interface 112, such as graphics and text. Vocalizing is the creation of implicit audio data to be played to the user representing the items on the visual user interface 112.

Figure 2:
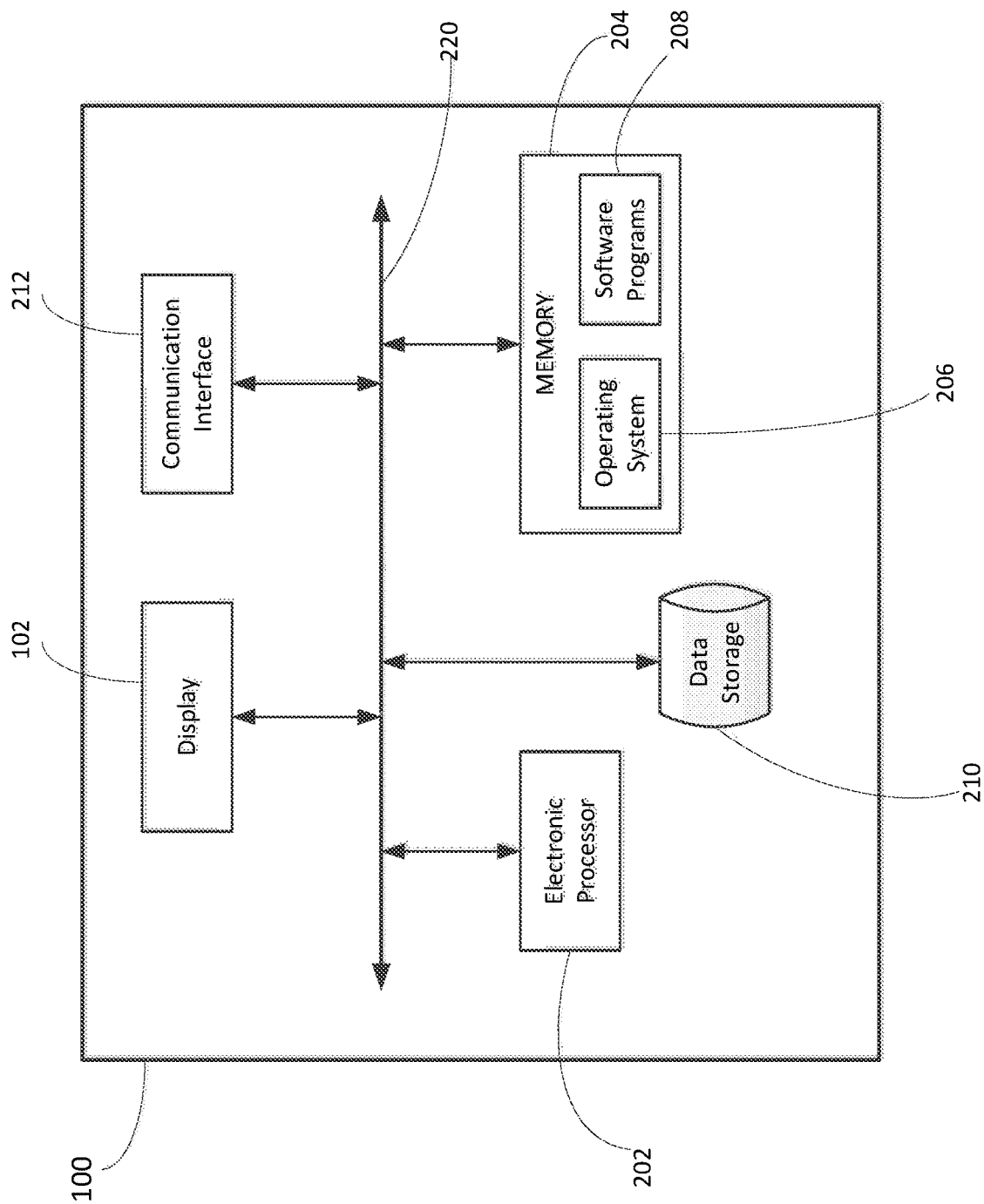
FIG. 2 illustrates a block diagram of the computing device shown in FIG. 1 in accordance with some embodiments.

FIG. 2 illustrates a block diagram of the computing device 100 in FIG. 1 in accordance with some embodiments. The computing device 100 may combine hardware, software, firmware, and system on-a-chip technology to implement a narration controller (shown in FIG. 3). The computing device 100 may include an electronic processor 202, a memory 204, data storage device 210, a display device 102, a communication interface 212 and a bus 220. The memory 204 may include an operating system 206 and one or more software programs 208 that provide algorithms to analyze items in the visual user interface 112 and render data associated with the analyzed items for vocalization. The electronic processor 202 may include at least one processor or microprocessor that interprets and executes a set of instructions stored in the memory 204. The one or more programs 208 may be configured to implement the methods described herein. The memory 204 may include volatile memory elements (for example, random access memory (RAM)), nonvolatile memory elements (for example, ROM), and combinations thereof. The memory 204 may have a distributed architecture, where various components are situated remotely from one another, but may be accessed by the electronic processor 202.

The data storage device 210 may include a non-transitory, tangible, machine-readable storage medium that stores machine-readable code or instructions. In one example, the data storage device 210 stores a set of instructions detailing a method provide herein that when executed by one or more processors cause the one or more processors to perform the method. The data storage device 210 may also be a database or a database interface for storing an application module. In one example, the data storage device 210 is located external to the computing device 100.

The bus 220, or other component interconnection, may permit communication among the components of the computing device 100. The bus 220 may be, for example, one or more buses or other wired or wireless connections, as is known in the art. The bus 220 may have additional elements, which are omitted for simplicity, such as controllers, buffers (for example, caches), drivers, repeaters and receivers, or other similar components, to enable communications. The bus 220 may also include address, control, data connections, or a combination of the foregoing to enable appropriate communications among the aforementioned components.

The communication interface 212 provides the computing device 100 a communication gateway with an external network (for example, a wireless network, the internet, etc.). The communication interface 212 may include, for example, an Ethernet card or adapter or a wireless local area network (WLAN) card or adapter (for example, IEEE standard 802.11a/b/g/n). The communication interface 212 may include address, control, and/or data connections to enable appropriate communications on the external network.

Figure 3:
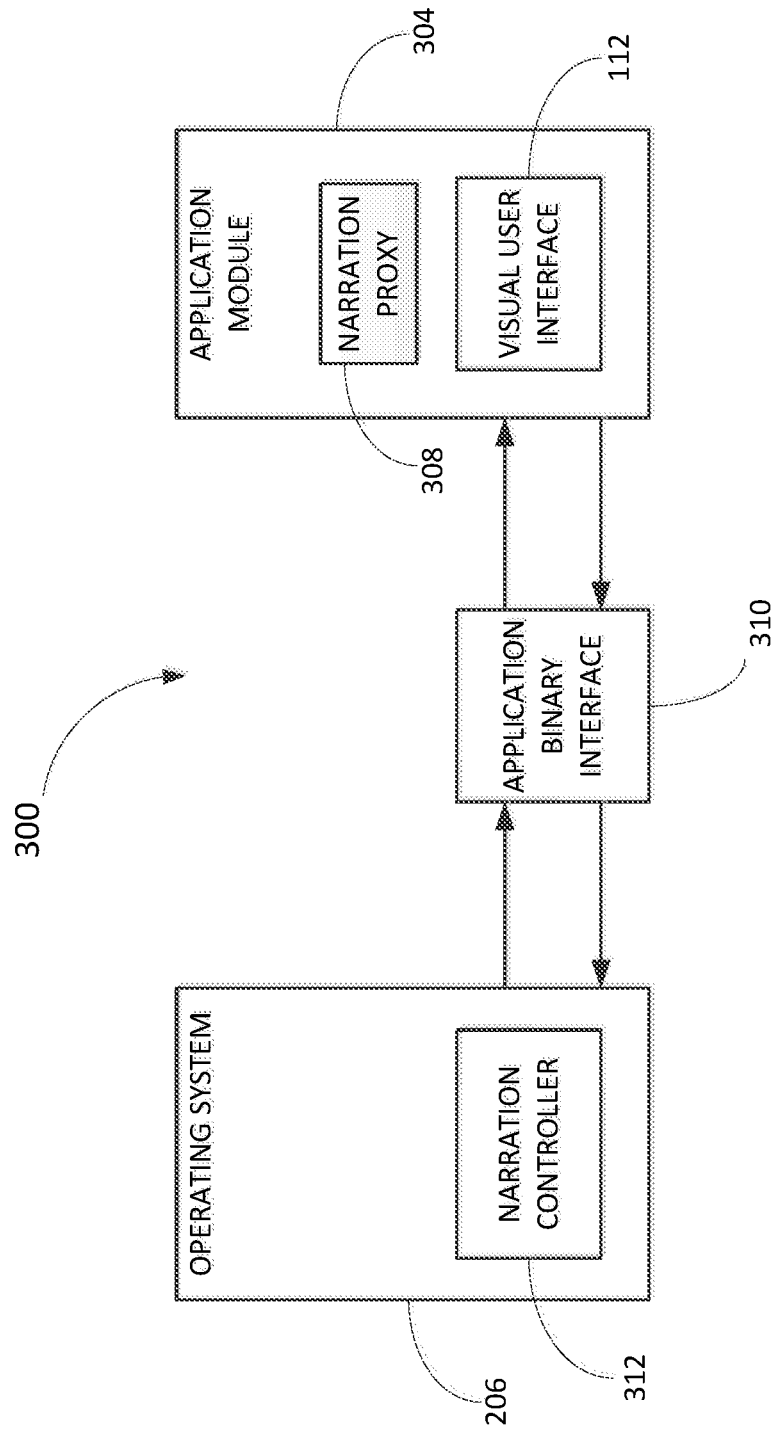
FIG. 3 illustrates a software application interaction, in accordance with some embodiments.

FIG. 3 illustrates an interaction 300 of software applications, in accordance with some embodiments. The computing device executes the operating system 206, which manages a software application module 304. The application module 304 is a software application, or portion of a software application. The application module 304 includes a visual user interface 112 and a narration proxy 308. In one embodiment, the application module 304 communicates with the operating system 206 via an application binary interface (ABI) 310. The application binary interface 310 is a tool allowing the application module 304 to access specific tools, functions, and/or calls provided by the operating system 206. One of the tools provided by the operating system 206 may be a narration controller 312. The narration controller 312 converts text from an application module 304 to an audio format to be played using the speaker 106 for a user. For example, the application module 304 may include a visual user interface 112 to receive inputs from a user via an input/output interface 212. The narration controller 312 may convert textual and graphical information presented in the visual user interface 112 to an audio format for presentation to the user. In some embodiments, the narration proxy 308 may pull data from an item in the visual user interface 112 and provide narration data associated with the item to the narration controller 312. The narration proxy 308 may be an extendible application markup language wrapping of an item in the visual user interface 112.

Figure 4:
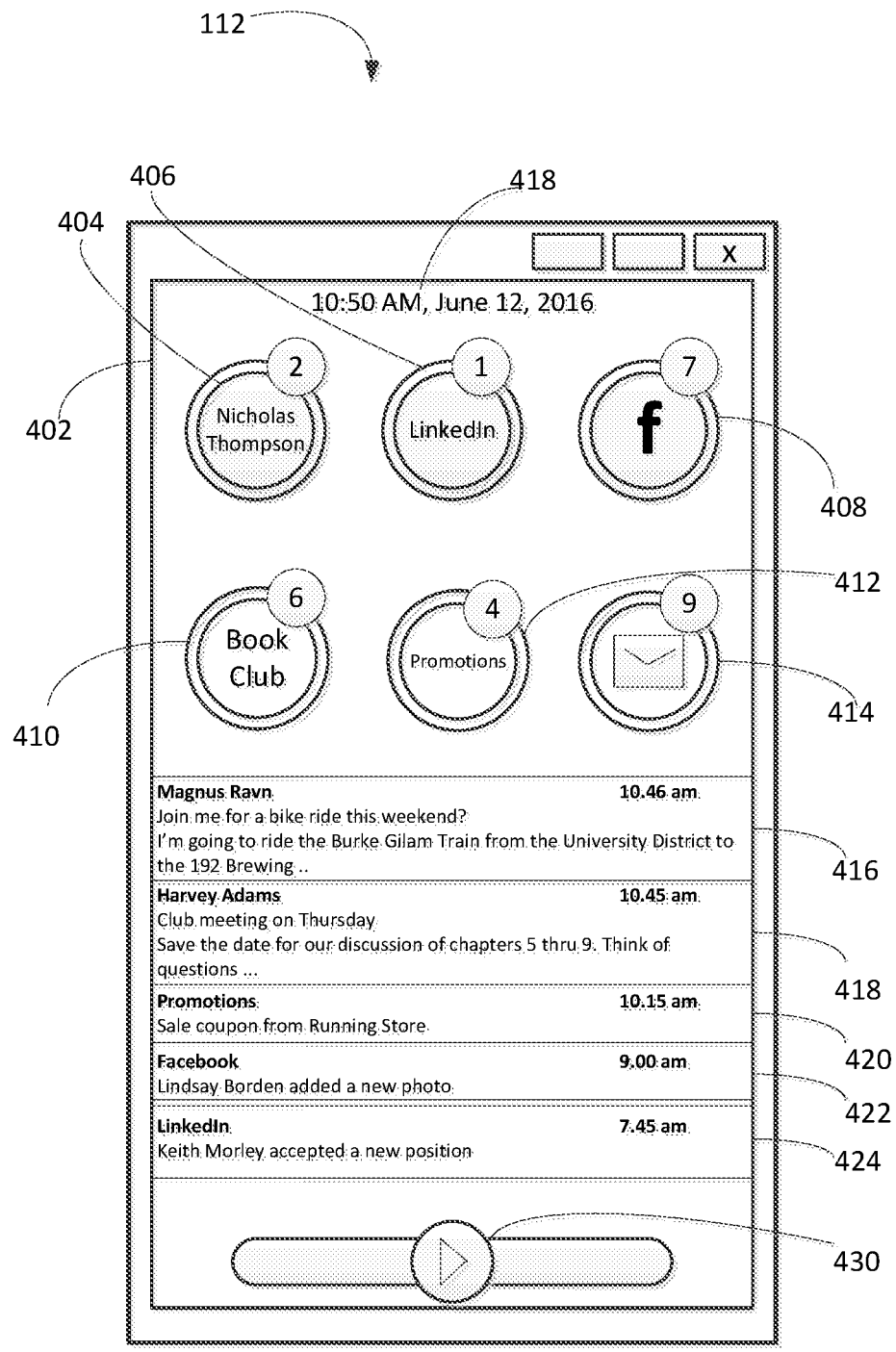
FIG. 4 illustrates a visual user interface of the computing device shown in FIG. 1, in accordance with some embodiments.

FIG. 4 illustrates a visual user interface 112, in accordance with some embodiments. The visual user interface 112 includes a visual frame 402 (for example, a window). The visual frame 402 includes one or more items 404, 406, 408, 410, 412, 414, 416, 418, 420, 422, and 424. In one example, the items 404, 406, 408, 410, 412, and 414 are icons that may include both textual and graphical information. For example, the item 404 may be associated with a message box of a user, "Nicholas Thompson." The item 404 may also show a count of the number of unread messages (in this case, "2") that the user has received. The item 406 may be associated with messages from a software application, "LinkedIn." The item 406 may also show a count of the number of unread messages (in this case, "1") that the user has received from "LinkedIn." The item 408 may be associated with messages from a software application, for example, "Facebook," and may also show a count of the number of unread messages (in this case, "7") that the user has received from the "Facebook" application. The item 410 may be associated with messages from an application namely "Book Club" and may also show a count of the number of unread messages (in this case, "6") that the user has received from the "Book Club" application. The item 412 may be associated from an application namely "Promotions" and may also shows a count of the number of unread messages (in this case, "4") that the user has received from the "Promotions" application. The item 414 may be associated with messages from an email system. The item 414 may also shows a count of the number of unread emails (in this case, "9") that the user has received.

In some embodiments, the narration controller 312 vocalizes the graphical and textual information associated with items 404, 406, 408, 410, 412, 414, 416, 418, 420, 422, and 424 in response to an input command (for example, using input 104) that the user provides to computing device 100. In one example, the input command includes an audio command. In another example, the input command is provided through a touch-sensitive display that displays visual user interface 112. In another embodiment, the input command is provided using a keypad (or keyboard) 110. In some embodiments, the visual user interface 112 includes a touch-sensitive icon 420 that is used to engage the narration controller 312. In an example, when the touch-sensitive icon 420 is activated, the narration controller 312 receives items 404, 406, 408, 410, 412, 414, 416, 418 and maps the textual and/or graphical information associated with items 404, 406, 408, 410, 412, 414, 416, 418, 420, 422, and 424 to audio narration information, which is then fed to the speaker 106 for the user of computing device 100 to hear.

Figure 5:
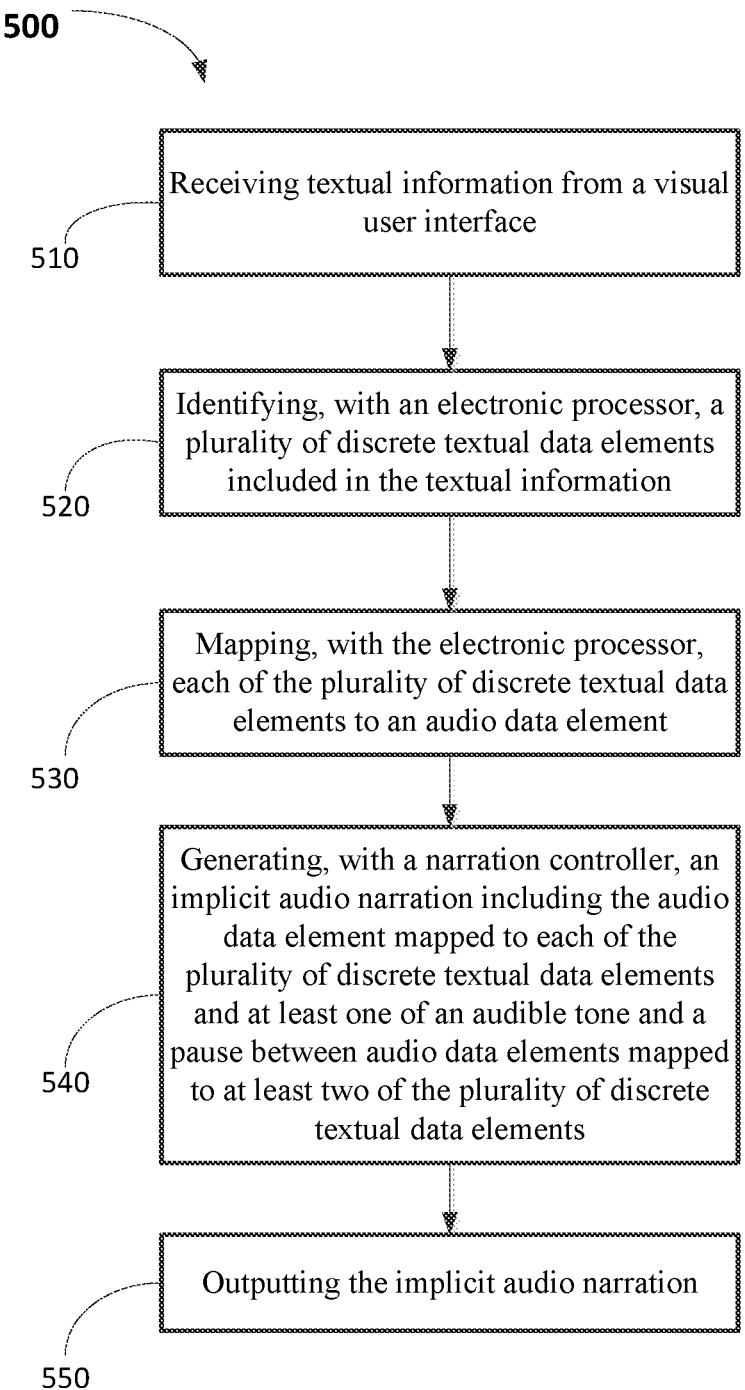
FIG. 5 is a flow chart of a method for controlling narration in accordance with some embodiments.

FIG. 5 is a flow chart of a method 500 for controlling narration in accordance with some embodiments. At block 510, the method 500 includes receiving textual information from the visual user interface 112. In one example, the textual information from the visual user interface 112 is received at the narration controller 312. Examples of textual information may include emails, text messages and other notifications from software programs or applications. Each of the emails, text messages and other notifications may have multiple text fields associated it such as timestamp, sender name, receiver names, subject, message body, etc. In some embodiments, the method 500 includes receiving graphical information from the visual user interface 112. The graphical information may be associated with icons presented at the visual user interface 112 (for example, Facebook, LinkedIn, etc.). At block 520, the method 500 includes identifying, with the electronic processor 202, discrete textual data elements in the textual information received from the visual user interface 112.

At block 530, the method 500 includes mapping, with the electronic processor 202, each of the discrete textual data elements to an audio data element. In some embodiments, method 500 includes determining, with the electronic processor 202, a scalable level of precision for the mapping of the textual information to the implicit audio narration. In one embodiment, determining the scalable level of precision include identifying and replacing all of the words in the textual information with fewer number of words (sometimes different words) that may be used for implicit audio narration. Examples of several mappings having a scalable level of precision that may be used for mapping textual information to the implicit audio narration are provided below. In one example, determining the scalable level of precision includes eliminating unnecessary trivia within the textual information by scaling the fidelity to the context associated with the textual information. In one example, the scalable level of precision provides for translating a group of words in the textual data elements into an audio data element thereby generating an implicit narration. In one example, the mapping of discrete textual data elements to the audio data element having a scalable level of precision includes mapping one or more fields associated with the textual information of an item 416, 418, 420, 422, 424, and 426 to one of the fuzzy time groupings (shown in FIG. 8). In one example, the method 500 further includes mapping a textual information including a time-stamp to an audio narration information having a relative indication of time associated with the time-stamp. In another example, the method 500 includes mapping textual information to audio narration information such that the audio narration information includes a variation of at least a vocabulary or grammar of the textual information.

At block 540, the method 500 includes generating, with a narration controller 312, an implicit audio narration including the audio data element mapped to each of the plurality of discrete textual data elements and at least one of an audible tone and a pause between audio data elements mapped to at least two of the plurality of discrete textual data elements. At block 550, the method 500 includes outputting the implicit audio narration information generated at block 540. In an example, a discrete textual data element is narrated after a first audible tone and before a second audible tone. In another example, a discrete textual data element is narrated after a first pause and before a second pause. In some embodiments, the method 500 includes inserting an audible tone to delineate a first item from a second item displayed by the visual user interface.

Some examples of the method 500 mapping and outputting implicit audio narration are provided below.

Example A

Timestamp: Friday, Oct. 28, 2016
Sender: Frank, frank@example.com>
Receiver: you, Carol Smith <carol@example.com>, Jim jim@@example.com, Arnold Arnold@example.com, Bob bob@example.com
Subject: Meet for lunch today?
Message body: Hey all, who is interested in going out to lunch today?
The narration information generated from the various fields associated with the email shown above in Example A are as follows:
Time: On Friday (assuming the time stamp is within the last 7 days)
Sender: Frank
Verb: asked
Direct object: none
Subject: "Meet for lunch today"
The implicit audio narration information that may be generated for the above email is given below:
On Friday, [pause] Frank [pause] asked, [pause] "Meet for lunch today?"

Example B

Assuming today's date is Tuesday, Nov. 1, 2016 and the following is the email message provided at the visual user interface 112:
Timestamp: Monday, Oct. 24, 2016 (over a week ago)
Sender: Jim jim@example.com
Receiver: Carol Smith carol@example.com, Jim jim@example.com
Subject: Samples for distributors
Message body: Here are the samples that the distributors requested.
The implicit audio narration information that may be generated for the above email is given below:
On October 24$^{th}$, [pause] Jim [pause] messaged [pause] Carol and Jim [pause] about [pause] "Samples for distributors."

Example C

Assuming today's date is Tuesday, Nov. 1, 2016 and the following is the email message rendered at the visual user interface 112:
Timestamp: Tuesday, Nov. 1, 2016 (assume it was sent 5 minutes ago)
Sender: Kim kim@example.com
Receiver: you you@example.com (assume it is the current user)
Subject: Let's meet to discuss sales numbers
Message body: Hey, are you free to meet tomorrow?
The implicit audio narration information that may be generated for the above email is given below:
A moment ago, [pause] Kim [pause] emailed you about [pause] "Let's meet to discuss sales numbers."

Figure 6:
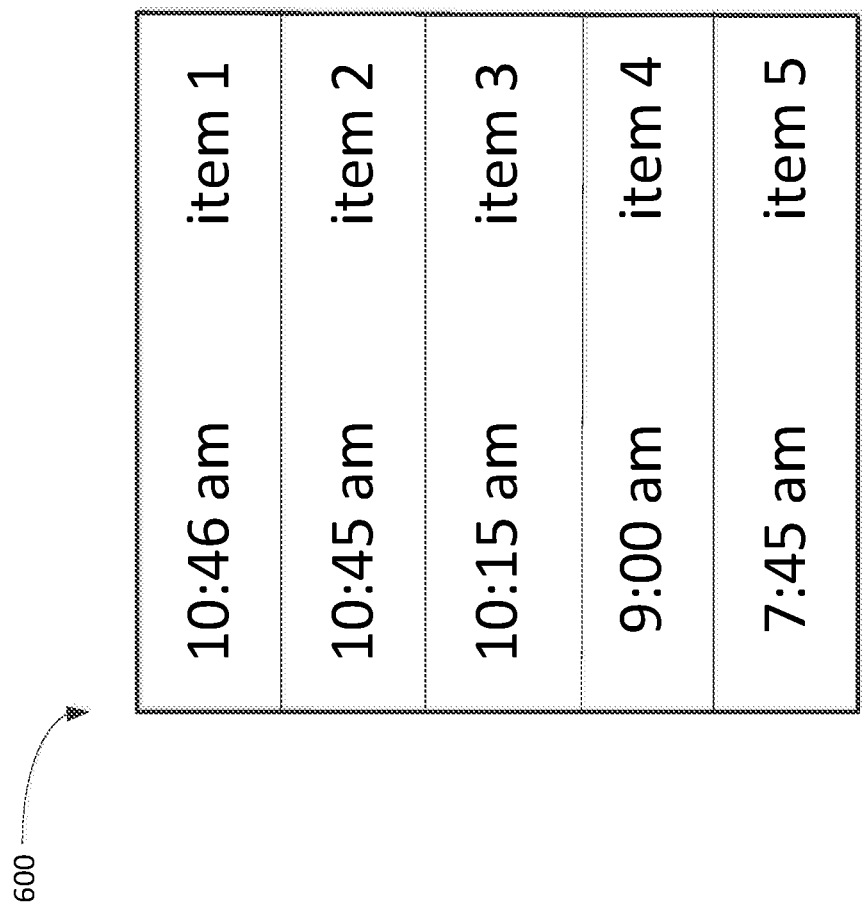
FIG. 6 illustrates an ordering of the times associated with items displayed on the visual user interface of FIG. 4, in accordance with some embodiments.

FIG. 6 illustrates an ordering 600 of the time-stamps 602 associated with some of the items displayed on the visual user interface of FIG. 4, in accordance with some embodiments. As shown in FIG. 6, "Item 1" has a time-stamp "10:46 am," and corresponds to a message from "Magnus Ravn" (416 shown in FIG. 4). "Item 2" has a time-stamp "10.45 am," and corresponds to a message from "Harvey Adams" (418 shown in FIG. 4). "Item 3" has a time-stamp "10:15 am," and corresponds to a message from "Promotions" (412 shown in FIG. 4). "Item 4" has a time-stamp "9:00 am," and corresponds to a message from "Facebook" (422 shown in FIG. 4). "Item 5" has a time-stamp "7:45 am," and corresponds to a message from "LinkedIn" (424 shown in FIG. 4).

Figure 7:
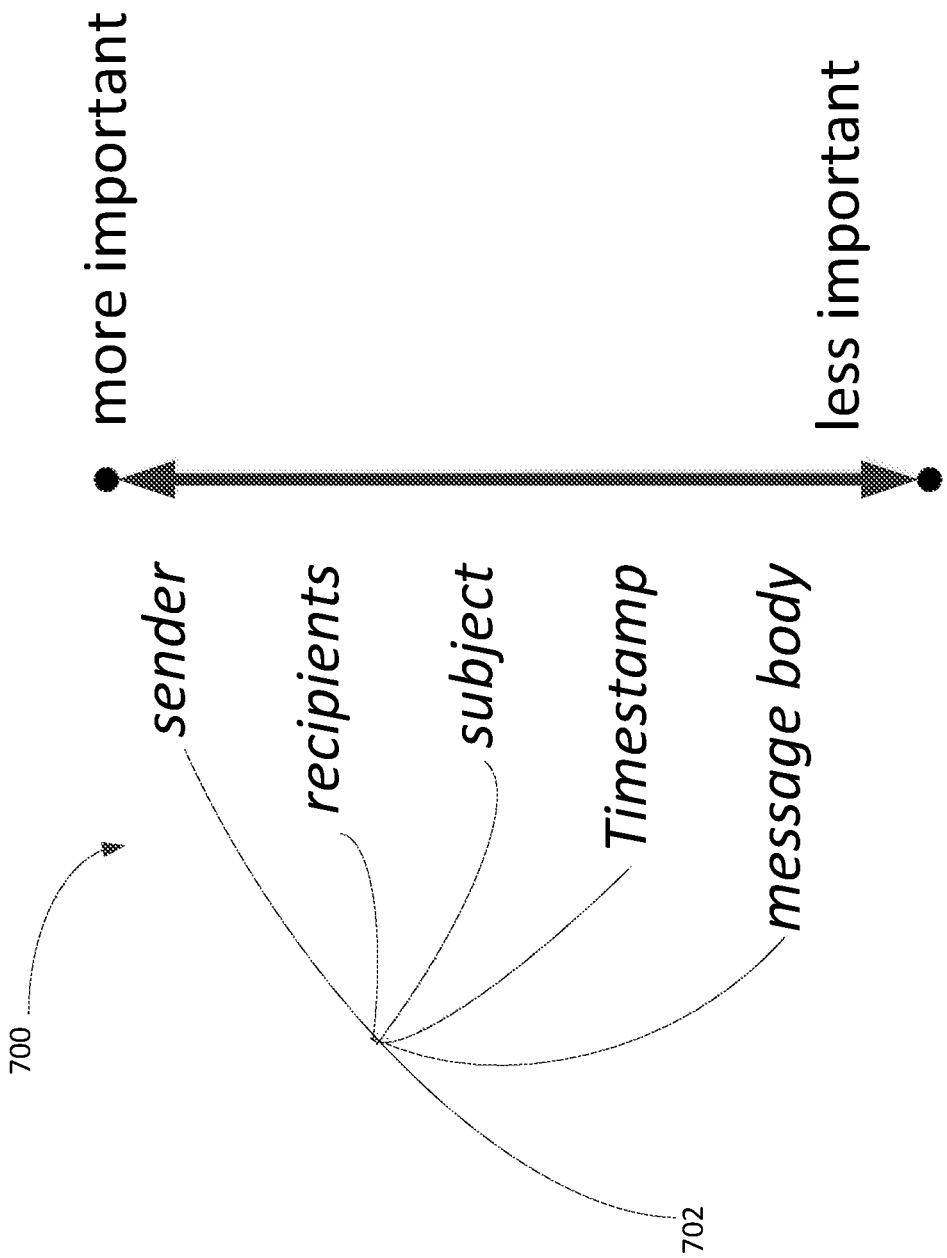
FIG. 7 illustrates a scale of the relative importance of the different portions of the content associated with each of the items presented in the visual user interface shown in FIG. 4, in accordance with some embodiments.

FIG. 7 illustrates a scale 700 of the relative importance of fields 702 within textual information associated with each of the items presented in the visual user interface shown in FIG. 4, in accordance with some embodiments. In the example shown in FIG. 7, the fields 702 include a sender field including a "sender", a recipients field including "recipients" of the message, a subject field including "subject" of the message, a timestamp field including the "time stamp" of the message, and a "message body" field including the entire message. As shown in FIG. 7, the "sender" is given a higher priority or importance compared to the "recipients" during a mapping of textual information to implicit audio narration information. Similarly, the "recipients" may be given higher priority or importance compared to the "subject," and the "subject" may be given higher priority or importance compared to the "time-stamp" during the mapping of textual information to implicit audio narration information.

Figure 8:
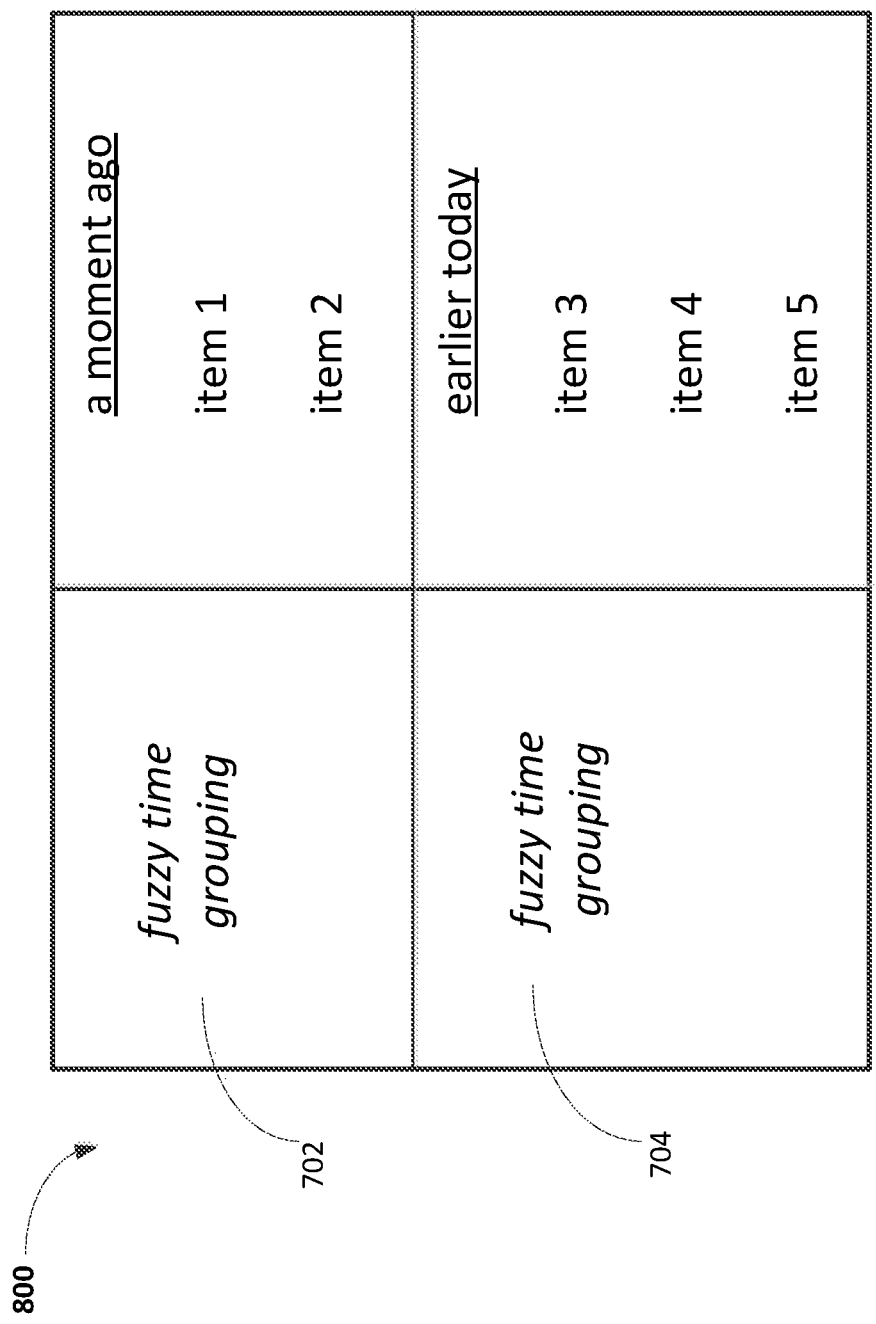
FIG. 8 illustrates fuzzy time grouping of the items shown in FIG. 4 in accordance with some embodiments.

FIG. 8 illustrates fuzzy time grouping 800 of the items shown in FIG. 5 in accordance with some embodiments. As shown in FIG. 8, fuzzy time grouping 800 includes a first fuzzy time grouping 802 and a second fuzzy time grouping 804. In one example, the first fuzzy time grouping 802 includes a grouping of "item 1" having a time-stamp of "10:46 am" and "item 2" having a time-stamp of "10:45 am." In one embodiment, the time-stamps of "item 1" and "item 2" in first fuzzy time grouping 802 is mapped to an audio narration information, that may be denoted as "a moment ago." In another example, the second fuzzy time grouping 804 includes a grouping of "item 3" having a time-stamp of "10:15 am," "item 4" having a time-stamp of "9:00 am," and "item 5" having a time-stamp of 7:45 am." In some embodiments, the time-stamps of "item 1," "item 2," and "item 3" in second fuzzy time grouping 804 is mapped to an audio narration information, that may be denoted as "earlier today."

Figure 9:
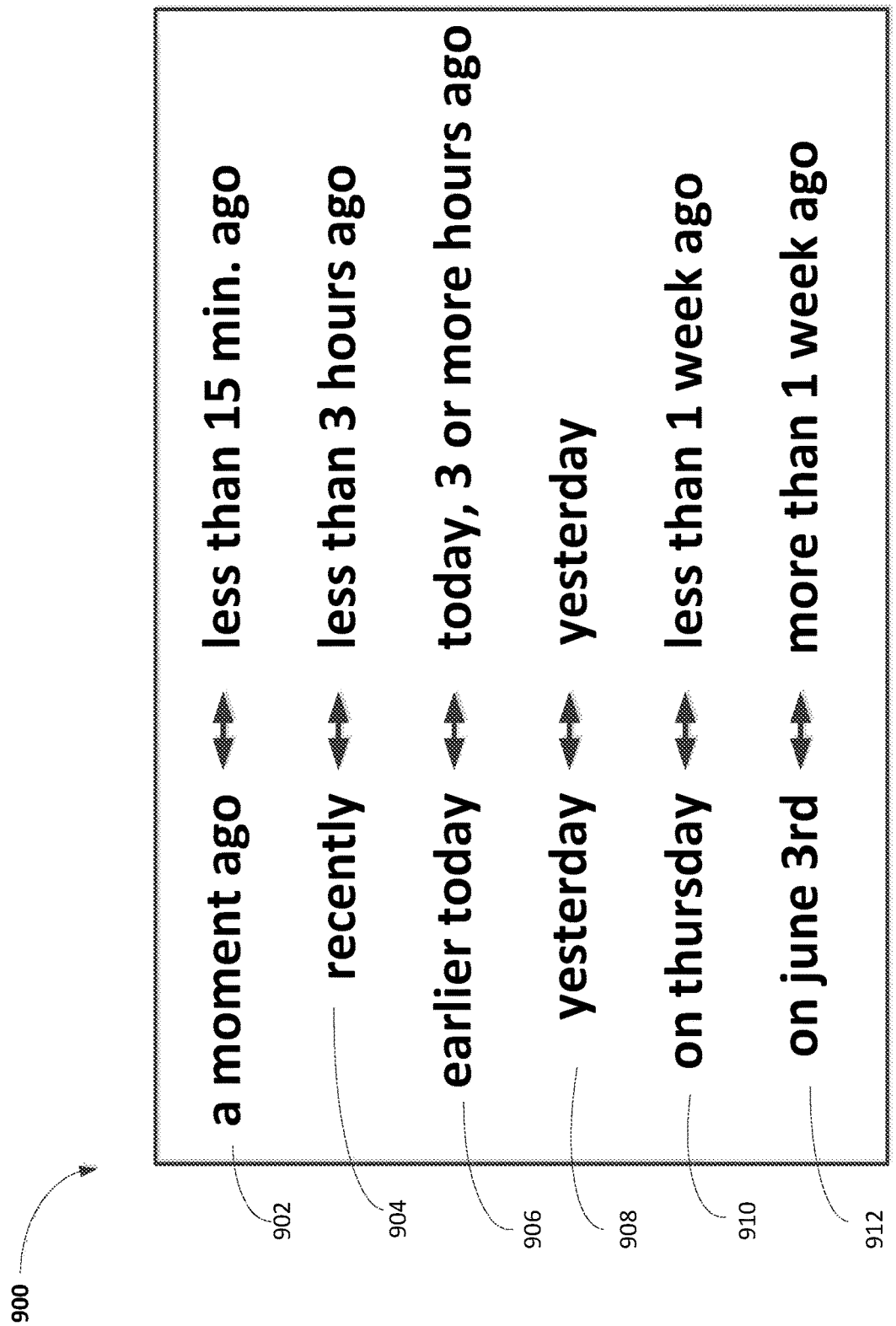
FIG. 9 illustrates mapping of the various times of receipt of electronic messages to audio narration phrases based on fuzzy time groupings in accordance with some embodiments.

FIG. 9 illustrates example mappings 900 of several time durations associated with the receipt of electronic messages to audio narration information based on fuzzy time groupings in accordance with some embodiments. The mapping 902 shows an implicit audio narration information of "a moment ago" for items having time-stamps that are "less than 15 minutes ago" compared to a current time (in this case, 10:50 am, Jun. 12, 2016, as shown in FIG. 4). The mapping 904 shows an implicit audio narration information including "recently" for items having time-stamps that are "less than three hours ago" compared to the current time. The mapping 906 shows an implicit audio narration information including "earlier today" for items having time-stamps from "today, more than three hours ago." The mapping 908 shows an implicit audio narration information including "yesterday" for items having time-stamps from "yesterday" (i.e., it was sent from 12:00 am to 11:59 pm of yesterday's calendar date (given the current user's time zone). The mapping 910 shows an implicit audio narration information including "on Thursday" for items that are "less than a week ago." The mapping 912 shows an audio narration information including "on June 3$^{rd}$" for items that are "more than a week ago." In another example (not shown in FIG. 9), if the time stamp is greater than 365 days ago, the month, the day, and the year are used for the implicit audio narration information (for example, "Dec. 1, 2011").

Figure 10:
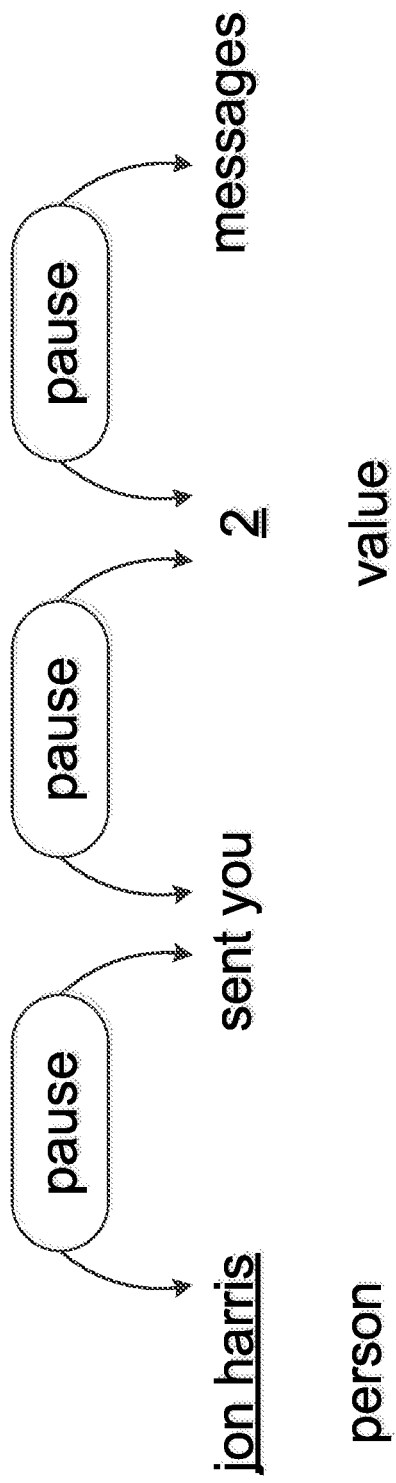
FIG. 10 illustrates the placement of pauses in an example narration of an item rendered by the visual user interface, in accordance with some embodiments.

FIG. 10 illustrates the placement of pauses in an example implicit narration of an item rendered by the visual user interface 112, in accordance with some embodiments. The text of the implicit narration "j on harris sent you 2 messages" may be divided into several discrete textual elements including "jon harris," "sent you,", "2," and "messages". The method 500 provides for the inclusion of a pause between the several discrete textual elements.

Figure 11:
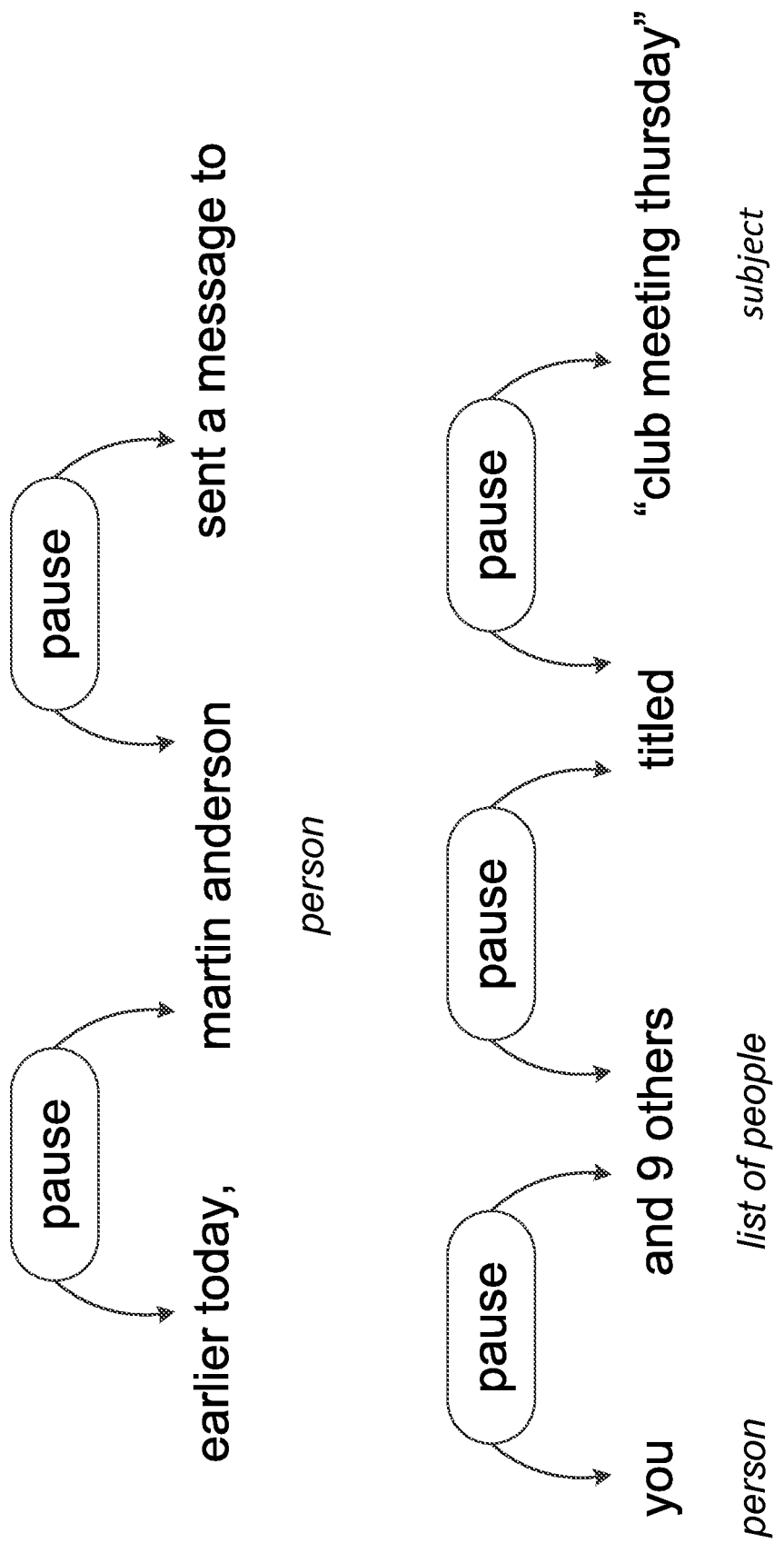
FIG. 11 illustrates the placement of pauses in an example narration of an item rendered by the visual user interface, in accordance with some embodiments.

FIG. 11 illustrates the placement of pauses in an example implicit narration of an item rendered by the visual user interface 112, in accordance with some embodiments. The text of the implicit narration "earlier today, martin anderson sent a message to you and 9 others titled "club meeting thursday" may be divided into several discrete textual data elements. The discrete textual data elements include "earlier today," "martin anderson," "sent a message to," "you," "and 9 others," "titled," and "club meeting thursday." The method 500 provides for the inclusion of a pause between the several discrete textual data elements.

In one example, the method 500 provides for taking an email and generating a "human listenable" summary sentence, which is then read to the user using synthesized speech. The method starts with an email message which is made up of multiple text fields such as timestamp (as to when the email was sent), sender name and email address (the "from" field), receiver names and email addresses (the "to" field combined with the "carbon copy or cc" field), subject, and a message body. Using these fields, the algorithm generates an implicit audio narration information, which may be in the form of a sentence. The sentence is then sent to an speech synthesis engine, which then reads out the sentence to the user in a synthesized humanlike voice. In some embodiments, the sentence generated by the method provided herein typically has a template as follows:

[time] [sender] [verb] [direct object] [recipients] [subject]

The following are some examples of sentences that may be generated from emails using the methods provided herein:

First Example

Yesterday, [pause] Lyndsay Pyfer wrote you about [pause] "Lunch tomorrow."

Second Example

This morning, [pause] John Smith asked, [pause] "Should we meet on Friday?"

Third Example

On Friday, [pause] Frank Anderson [pause] sent a message to [pause] you and [pause] 3 others about [pause] "Welcome our newest employee."

In the first example shown above, "Yesterday" is the time, "Lyndsay Pyfer" is the sender, "wrote" is the verb, recipients is "you," and subject is "Lunch tomorrow," and there is no object in the sentence.

In the second example shown above, "This morning" is the time, "John Smith" is the sender, "asked" is the verb, there are no recipients but "you" is implied, "Should we meet on Friday" is the subject and there is no object but "asked" a transitive verb may be used.

In the third example shown above, "On Friday" is the time, "Frank Anderson" is the sender, "sent" is the verb, "a message" is the direct object, "to you and 3 others" is the recipients, and about "Welcome our newest employee" is the subject.

In one embodiment, the time portion of the sentence is generated by taking the current time (from the user's current time zone) and comparing it against the email timestamp. The various rules that are used for picking the time portion of the sentence is discussed in greater detail below under the description for FIG. 9.

The sender field in an email typically may take the form "First-name Last-name email@domain.com." Sometimes the "First-name Last-name" portion may not be included or only a "First-name" is given or some other descriptor for the sender may be used, such as "XYZ Corporation, Inc." The methods provided herein uses the non-email address portion (i.e., "First-name Last-name"), if available. If the First-name and Last-name is not available, the email address (for example, email@domain.com) is used for the sender information. If any metadata is available that discloses the sender's given name then the method uses that information instead of the email address. Such metadata may be available in an organizational address book that may be accessible by the methods described herein. Finally, if the sender is the current user (for example, the email address corresponds to the current user), then "you" is used as the sender for the sentence being prepared for implicit audio narration. Some examples describing the above is shown below:

Example 1

Carol Smith <carol@example> becomes "Carol Smith" (or "Carol" if metadata is available that says "Carol" is the first-name).

Example 2

Some Company, Inc. <company@example.com> becomes "Some Company, Inc."

Example 3

<fred@example.com> becomes "fred@example.com"

In some embodiments, the logic for what verb is used depends on three things, the subject, the recipients, and the message body contents. From these three inputs, the method first generates local metadata that may be used with a set of rules as provided below.

If the subject is prefixed with "Re:" then the email is treated as a reply

If subject ends with a period (".") then it is considered as a complete sentence.

If the subject ends with a question mark ("?") and is not a reply then the message is treated as a question.

If it is a meeting request—the message body contains a meeting invitation

If the subject ends in an exclamation mark ("!"), then the message is treated as an exclamation If the recipient list only contains the current user and no other email addresses, the message is treated as a direct message (example implicit audio narration information may include "sent only to you")

If the subject is prefixed with "Fw:" or "Fwd:", then the message is treated as a forward message.

If a message body is a meeting invite and is a forwarded message, the method uses "invited" as the verb followed by the list of recipients and then the original meeting organizer's name followed by the subject and "event" (as in the examples shown below):
Lyndsay invited you to Anna Gregory's "Design Strategy Workshop event"
Lyndsay invited you, Tom, and 3 others to Anna Gregory's "Design Strategy Workshop" event
Lyndsay invited the All Employees group to Anna Gregory's Design Strategy Workshop" event.

If the message body is a meeting invite and the current user is the only recipient, the method uses "you're invited to" as the verb. The sender is dropped and instead replaced as the possessive of the indirect object (as in the examples shown below):
You're invited to Ann Gregory's "Design Strategy" event.
You're invite to Jeff's "Party this weekend" event.

If the message body is a meeting invite and the recipient is one or more contacts who are not the current user, the method expands the list of recipients and drops the sender and moves them to the indirect object and uses "are invited" or "is invited" as the verb (as in the examples shown below):
You and five others are invited to John's Design Strategy" event.
The All employees group is invited to the "All-Hands Meeting" event.

If the message is a reply to a meeting invite then randomly pick one of "responded to attendees" or "messaged attendees" as the verb (as in the examples provided below):
Lyndsay responded to attendees of Anna Gregory's "Design Strategy Workshop" event.
Lyndsay message attendees of Anna Gregory's "Design Strategy Workshop" event.

If a message is a reply and the message is a question and the original asker was the current user and the sender is anyone other than the current user, use the verb "answered your question" and drop the recipient (as in the examples provided below)
Charles answered your question about "Parking?"
Jeff answered your question about "What time do we meet tomorrow?"

If a message is a reply and the message is a question and the original asker is not the current user, the method uses the verb "answered the question" and drops the recipient (as in the examples provided below):
Charles answered the question, "Where are we?"
Jeff answered the question, "How much time do we have left on the project?"

If a message is a reply and not a question, the method randomly picjs "replied to a message" or "followed up on a message" as the verb and direct object (as in the examples provided below).
Lyndsay replied to a message about "Book Club."
Lyndsay followed up on a message about "Travel info."

If the message is a reply to all, omit the recipients and randomly pick one of the verbs "responded to," "reacted to," or "commented on." The direct object is "the discussion." Some examples are provided below:
Jim responded to the discussion about "Sales numbers."
Jim reacted to the discussion about "Summer vacations."
Arnold commented on the discussion about "Reports."

If the message is a forward, randomly pick the verb out of "forwarded," passed along," and "circulated". Use "message" as the direct object. If "circulated" is used, drop the recipient. Some examples are provided below:
John forwarded you a message about "Sales numbers"
Agnes passed along to you and Sam a message about "New bottle designs."
Mindy circulated a message about "Traffic this weekend."

If a subject is a complete sentence, then the method randomly picks one of the following: "wrote," "sent," "messaged," "emailed." If "sent" is used, the direct object is "a message." For example, "John Smith sent you a message about "Meeting on Tuesday"."

If subject is a question, the method randomly picks a verb out of the following: "asked," "wanted to know," "wondered." The recipient is omitted and there is no direct object. An example is provided below:
"Frank asked, "Are you free tomorrow?" (this is narrated regardless of the recipients)

If the subject has an exclamation, the verb used would be "exclaimed." The recipients are omitted and there is no direct object. An example of this is provided below:
Lyndsay Pyfer exclaimed, "Donuts in kitchen!"

If none of the above rules apply and message was sent to only the user, then the method randomly picks the verb out of "messaged you," "wrote you," "reached out to you," "sent you a message" and insert "about" before the subject. Some examples are provided below:
John Smith wrote you about "Samples"
John Smith reached out to you about "Gold tournament."
John Smith sent you a message about "Tax returns."

If none of the above rules apply and the message is sent to one recipient that is a group email address, randomly pick the verb out of "messaged," "emailed," "distributed a message to." Some examples are included below:
Fred distributed a message to All Employees group and 2 others about "Sandwiches in the kitchen."
Shane messaged the Partytime group about "Get-together this weekend."

If none of the above apply and message is sent to multiple recipients, randomly pick one of the verbs "message," wrote," "reached out to," "sent a message to" followed by a list of the recipients.

Similar to the sender portion of the sentence that is described above, the recipients information is extracted for each recipient on the list. If no "first-name last-name" is found, then the raw email address is used. If the recipient is a group, the name is prefixed with "the" and suffixed with "group" (for example, "the All Employees group," "the Volunteer Organizers group"). When the current user is the recipient, "you" is used instead of their name or email address. In some cases, the recipient is dropped from the sentence. For instance when "asked" is the verb, the recipient is dropped (for example, "John Smith asked "Where are the reports?," "Fred wondered "where is the meeting tomorrow?." If the recipient is one or more contacts, then list out the recipients in the order in which they appear in the recipient field, but ensure the current user is sorted to the front of the list. If the current user is in the recipient list, use "You" instead of their "first-name last-name" or email address. If there are 4 or more recipients, drop the last "n–2" and replace them with "(n–2) others (where "n" is the total number of recipients." Some examples of such an implantation are provided below:

Two recipients where current user is one recipient and other is "Brad Johnson <brad@example.com>" becomes "You and Brad."

Three recipients where current user is one recipient and others are "Brad Johnson <brad@example.com>" and "Fred fred@example.com" becomes "You, Brad, and Fred."

Four recipients: "Amy amy@example.com," "Brad Johnson brad@example.com," "Carol carol@example.com," and "Fred <fred@example.com>" becomes "Amy, Brad and 2 others."

The subject portion of the message is generally includes as-is except in the case that it contains any of the following prefixes: "fwd:", "fw:", and "re:". If any of these appear as a prefix in the subject, they are removed. Some examples of these are provided below:

"Re: Can we get some samples?" is mapped to "Can we get some samples"

"Fw: Here is a funny email" is mapped to "Here is a funny email"

"Need samples" stays the same

"Question about the document" stays the same

In some embodiments, method 500 provides a tone to denote when the narration has moved from one item to the next when reading through a text. In an example, while reading within a particular inbox, the same audio tone may be used between various discrete textual elements of the narration. In another example, when the user transitions from a header information to a body information, an audio tone may be used to indicate the transition. The audio tone used for indicating transition may be different from the audio tone used between narration of discrete textual elements.

In some embodiments, software described herein may be executed by a server, and a user may access and interact with the software application using a portable communication device. Also, in some embodiments, functionality provided by the software application as described above may be distributed between a software application executed by a user's portable communication device and a software application executed by another electronic process or device (for example, a server) external to the portable communication device. For example, a user can execute a software application (for example, a mobile application) installed on his or her smart device, which may be configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

Thus, embodiments provide, among other things, systems and methods for implicit narration. Various features and advantages of some embodiments are set forth in the following claims.

What is claimed is:

1. A computing device, the computing device comprising:
a visual user interface including textual information and graphical information associated with a message; and
an electronic processor executing instructions to
identify a plurality of discrete textual data elements included in the textual information and the graphical information associated with the message;
determine a context associated with the plurality of discrete textual data elements in the message
arrange the plurality of textual data elements based on an order of importance associated with an item, wherein the item is selected from the group consisting of a sender, a recipient, a subject, a timestamp, and a body of the message, and wherein the order of importance of the items is a scale of relative importance between at least three of the items;
map each of the plurality of discrete textual data elements to an audio data element;
generate an implicit audio narration including audio data elements arranged in the order of importance and having an item selected from the group consisting of an audible tone and a pause between the two or more audio data elements based on the context associated with the discrete textual data elements; and
output the implicit audio narration.

2. The computing device of claim 1, wherein the electronic processor executing further instructions to
generate the implicit audio narration including a first audible tone, a first audible data element associated with a name, and a second audible tone, wherein the first audible data element is narrated after the first audible tone and before the second audible tone.

3. The computing device of claim 1, wherein the electronic processor executing further instructions to
generate the implicit audio narration include a first pause, a first audible data element associated with a name, and a second pause, wherein the first audible data element is narrated after the first pause and before the second pause.

4. The computing device of claim 1, wherein the electronic processor executing further instructions to
analyze the textual information; and
determine, with the electronic processor, a scalable level of precision of mapping of each of the plurality of discrete textual data elements to the audio data element.

5. The computing device of claim 1, wherein the electronic processor executing further instructions to
map a first textual information including a time-stamp of the message to a first audio narration information, the first audio narration information including a relative indication of a time associated with the time-stamp of the message.

6. The computing device of claim 1, wherein the electronic processor executing further instructions to
map a first textual information to a first audio narration information, the first audio narration information including a variation of at least one of a vocabulary and a grammar of the first textual information.

7. The computing device of claim 1, wherein the electronic processor executing further instructions to
insert an audible tone to delineate a first item from a second item, the first item and the second item displayed on visual user interface.

8. A method for controlling narration, the method comprising:
receiving textual and graphical information associated with a message from a visual user interface;
identifying, with an electronic processor, a plurality of discrete textual data elements included in the textual and graphical information associated with the message;
determining a context associated with the plurality of discrete textual data elements in the message;
arranging the plurality of textual data elements based on an order of importance associated with an item, wherein the item is selected from the group consisting of a sender, a recipient, a subject, a timestamp, and a body of the message, and wherein the order of importance of the items is a scale of relative importance between at least three of the items;
mapping, with the electronic processor, each of the plurality of discrete textual data elements to an audio data element;
generating, with a narration controller, an implicit audio narration including audio data elements arranged in the order of importance and having an item selected from the group consisting of an audible tone and a pause between the two or more audio data elements based on the context associated with the discrete textual data elements; and
outputting the implicit audio narration.

9. The method of claim 8, wherein generating the implicit audio narration comprises generating a first audible tone, a first audible data element associated with a name, and a second audible tone, the first audible data element is narrated after the first audible tone and before the second audible tone.

10. The method of claim 8, wherein generating the implicit audio narration comprises generating a first pause, a first audible data element associated with a name, and a second pause, wherein the first audible data element is narrated after the first pause and before the second pause.

11. The method of claim 8 further comprising:
analyzing the textual information; and
determining, with the electronic processor, a scalable level of precision of mapping of each of the plurality of discrete textual data elements to the audio data element.

12. The method of claim 8, further comprising:
mapping a first textual information including a time-stamp of the message to a first audio narration information, the first audio narration information including a relative indication of a time associated with the time-stamp of the message.

13. The method of claim 8, further comprising:
mapping a first textual information to a first audio narration information, the first audio narration information including a variation of at least one of a vocabulary and a grammar of the first textual information.

14. The method of claim 8, further comprising:
inserting an audible tone to delineate a first item from a second item, the first item and the second item displayed on visual user interface.

15. A tangible machine-readable medium containing computer-executable instructions that when executed by one or more processors cause the one or more processors to perform a method, the method comprising:
receiving textual and graphical information associated with a message from a visual user interface;
identifying, with an electronic processor, a plurality of discrete textual data elements included in the textual and graphical information associated with the message;
determining a context associated with the plurality of discrete textual data elements in the message
arranging the plurality of textual data elements based on an order of importance associated with an item, wherein the item is selected from the group consisting of a sender, a recipient, a subject, a timestamp, and a body of the message, and wherein the order of importance of the items is based on a scale of relative importance between at least three of the items;
mapping, with the electronic processor, each of the plurality of discrete textual data elements to an audio data element;
generating, with a narration controller, an implicit audio narration including audio data elements arranged in the order of importance and having an item selected from the group consisting of an audible tone and a pause between the two or more audio data elements based on the context associated with the discrete textual data elements; and
outputting the implicit audio narration.

16. The tangible machine-readable medium of claim 15, wherein generating the implicit audio narration comprises generating a first audible tone, a first audible data element associated with a name, and a second audible tone, wherein the first audible data element is narrated after the first audible tone and before the second audible tone.

17. The tangible machine-readable medium of claim 15, wherein generating the implicit audio narration comprises generating a first pause, a first audible data element associated with a name, and a second pause, wherein the first audible data element is narrated after the first pause and before the second pause.

18. The tangible machine-readable medium of claim 15, wherein the method further comprising:
analyzing the textual information; and
determining, with the electronic processor, a scalable level of precision of mapping of each of the plurality of discrete textual data elements to the audio data element.

19. The tangible machine-readable medium of claim 15, wherein the method further comprising:
mapping a first textual information including a time-stamp of the message to a first audio narration information, the first audio narration information including a relative indication of a time associated with the time-stamp of the message.

20. The tangible machine-readable medium of claim 15, wherein the method further comprising:
inserting an audible tone to delineate a first item from a second item, the first item and the second item displayed on visual user interface.

* * * * *